(12) United States Patent
Di Giorgio et al.

(10) Patent No.: US 12,040,471 B2
(45) Date of Patent: Jul. 16, 2024

(54) HYBRID ENERGY STORAGE SYSTEM WITH CHEMICAL/ELECTROCHEMICAL DUAL TECHNOLOGY FOR MOBILE, PROPULSIVE AND STATIONARY APPLICATIONS

(71) Applicants: Paolo Di Giorgio, Cermignano (IT); Elio Jannelli, Naples (IT); STAEL-LAB S.R.L., Florence (IT); ATENA S.C.A.R.L., Naples (IT)

(72) Inventors: Paolo Di Giorgio, Cermignano (IT); Elio Jannelli, Naples (IT); Fiorentino Valerio Conte, Augsburg (DE)

(73) Assignees: Paolo Di Giorgio, Carmignano (IT); Elio Jannell, Naples (IT); STAEL-LAB S.R.L., Florence (IT); ATENA S.C.A.R.L., Naples (IT)

( * ) Notice: Subject to any disclaimer, the term of this patent is extended or adjusted under 35 U.S.C. 154(b) by 0 days.

(21) Appl. No.: 17/604,562

(22) PCT Filed: Apr. 14, 2020

(86) PCT No.: PCT/IT2020/050094
§ 371 (c)(1),
(2) Date: Oct. 18, 2021

(87) PCT Pub. No.: WO2020/213017
PCT Pub. Date: Oct. 22, 2020

(65) Prior Publication Data
US 2022/0200084 A1      Jun. 23, 2022

(30) Foreign Application Priority Data
Apr. 16, 2019   (IT) .................. 102019000005858

(51) Int. Cl.
*H01M 16/00* (2006.01)
*B60L 50/75* (2019.01)
(Continued)

(52) U.S. Cl.
CPC ........... *H01M 16/006* (2013.01); *B60L 50/75* (2019.02); *B60L 58/26* (2019.02); *B60L 58/27* (2019.02);
(Continued)

(58) Field of Classification Search
CPC ........... H01M 16/006; H01M 8/04216; H01M 8/065; H01M 10/643; H01M 10/658;
(Continued)

(56) References Cited

U.S. PATENT DOCUMENTS

2012/0141842 A1*  6/2012  Rich .................... H01M 10/613
                                                      429/9
2014/0377622 A1* 12/2014  Glauning ............ H01M 10/613
                                                      429/120

OTHER PUBLICATIONS

Schier et al., Combining Mechanical, Electrical and Thermal Energy Conversion for Ecological Vehicle Energy Harvesting Concepts, 2018 Thirteenth International Conference on Ecological Vehicles and Renewable Energies, Apr. 2018 (Year: 2018).*

* cited by examiner

*Primary Examiner* — Adam A Arciero
(74) *Attorney, Agent, or Firm* — Maier & Maier, PLLC

(57) ABSTRACT

A hybrid energy storage system with chemical/electrochemical dual technology for mobile, propulsion and stationary applications of electric power units, used to supply energy to a user, including a battery pack having a plurality of batteries and a tank containing metal hydrides arranged in thermal contact with the batteries that form said battery pack. The hydride tank includes a plurality of tanks integrated in the battery pack. The system includes a contain- (Continued)

ment body in which several housings are formed for the tanks and the batteries, respectively.

8 Claims, 3 Drawing Sheets

(51) Int. Cl.
*B60L 58/26* (2019.01)
*B60L 58/27* (2019.01)
*B60L 58/40* (2019.01)
*H01M 8/04082* (2016.01)
*H01M 8/065* (2016.01)
*H01M 10/643* (2014.01)
*H01M 10/658* (2014.01)
*H01M 10/66* (2014.01)
*H02J 15/00* (2006.01)

(52) U.S. Cl.
CPC ......... *B60L 58/40* (2019.02); *H01M 8/04216* (2013.01); *H01M 8/065* (2013.01); *H01M 10/643* (2015.04); *H01M 10/658* (2015.04); *H01M 10/66* (2015.04); *H02J 15/008* (2020.01); *B60Y 2200/92* (2013.01); *H02J 2300/30* (2020.01)

(58) Field of Classification Search
CPC ........ H01M 10/66; B60L 50/75; B60L 58/26; B60L 58/27; B60L 58/40; H02J 15/008; H02J 2300/30
See application file for complete search history.

HYBRID ENERGY STORAGE SYSTEM WITH CHEMICAL/ELECTROCHEMICAL DUAL TECHNOLOGY FOR MOBILE, PROPULSIVE AND STATIONARY APPLICATIONS

FIELD

The transport of goods and people covers a considerable part of the consumption of oil and its derivatives. In the perspective of reduction of climate-changing emissions and the consumption of fossil fuels, electric mobility in general is taking on an increasingly important role. In particular, battery electric vehicles (also called BEV, acronym for "battery electric vehicle") seem to be the most technologically ready solution for the replacement of traditional vehicles with internal combustion engines, but their diffusion is hindered by problems still unsolved such as the costs of charging infrastructure, long charging time and the high cost of the battery pack necessary to ensure adequate driving range. Fuel cell vehicles (or FCEV, "Fuel Cell Electric Vehicle"), on the other hand, allow to have vehicles with refueling times and driving range comparable with traditional vehicles, but their diffusion is also prevented by costs and by the time needed to build the infrastructure for the distribution of hydrogen which is still in an embryonic phase and by the still high costs of fuel cells.

By combining the advantages of both of the solutions mentioned above, plug-in fuel cell powered vehicles (PFCEV: "plug-in fuel cell electric vehicle") can overcome or at least limit the drawbacks described above. A PFCEV vehicle has a small battery pack, which allows for some electric range and a recharge that can be performed directly from the electric grid (without the need for a "supercharger" infrastructure, i.e. without the need for a device specially designed to provide a fast recharge), and a hydrogen fuel cell that operates as a "range extender", that is to say that allows to increase the driving range of the vehicle. Battery range can satisfy most commutes, so the need for a widespread diffusion of a hydrogen distribution infrastructure (necessary for the fuel cell) would be mitigated, implying lower infrastructure costs.

BACKGROUND

An example of a control system for plug-in electric vehicles with extended range is described in WO2016053786A1. This document describes a plug-in electric vehicle that primarily uses a battery as energy source and uses a secondary power source, such as a fuel cell subsystem, to extend the vehicle's range. A control subsystem operates the secondary power source to minimize fuel consumption in correspondence of the end of the journey.

It is known that each automotive battery pack, both in a hybrid or fully electric vehicle, requires a "thermal management" (temperature control) system to keep the cells within the optimum operating temperature range, and a system that is able to counteract phenomena such as the "thermal runaway". The thermal runaway of a cell is an uncontrolled increase of its temperature that can be activated by a malfunction (inside or outside the cell) or by the temperature rise of the cell itself. So, if the thermal runaway involves a single cell, this phenomenon, if not properly controlled, can lead to an explosion as it can involve an increasing number of cells.

"Combining mechanical, electrical and thermal energy conversion for ecological vehicle energy harvesting concepts." (Michael Schier, 2018, Thirteenth International Conference on Ecological Vehicles and Renewable Energies—EVER) discloses a system comprising two metal hydride tanks and a "fuel cell" configured in such a way that during a regeneration semi-cycle one reactor is filled by a pressurized hydrogen tank producing heat and, in a subsequent cooling semi-cycle, hydrogen is fed to the fuel cell with heat absorption and cold production. The continuity of the process is ensured by using a second reactor that alternates with the first. FIG. 11 of this document schematically illustrates the use of the system described above in an electric vehicle, providing four thermal circuits, three of which are configured for the thermal conditioning of the battery, the on-board electronic systems and the passenger compartment. The system uses heat exchangers and pumps for the circulation of a fluid through which the heat exchange is physically carried out. This system, in particular the embodiment illustrated in FIG. 11, involves the use of a complex heat exchange system which involves the use of pumps, heat exchangers and four circuits for the circulation of heat transfer fluids, which leaves unsolved the problems related to the quest of a higher energy density of the system, to the control of thermal drifts, to the elimination of components subject to wear such as for example the pumps (which, moreover, must be electrically powered), to the elimination of exchangers and related circuits for heat transfer fluids, to the reduction of the dimensions and to the reduction of the weights.

US2014/141842A1 describes a portable device (such as smart phone, tablet e-reader etc., generally referred to as "mobile electronic device") in which a fuel cell and a solid-state battery are mutually arranged to allow the battery to cool. This document does not describe a system capable of ensuring both cooling and heating of the battery and leaves the problems mentioned above unsolved.

SUMMARY

Among the purposes of the present invention, there is that of realizing a hybrid energy storage system capable of optimizing the performance of the components and realizing a thermal conditioning system for both the battery pack and the metal hydrides tank, achieving the following advantages:
  possibility of heating and cooling metal hydrides and batteries;
  reduction of thermal runaway risks inside the package;
  guarantee a lower thermal imbalance between the cells inside the pack;
  increase in overall energy density (Wh/kg);
  absence of components subject to wear such as pumps, refrigeration circuits, etc.
  reduction of the overall volumes of the storage system.

The attempts to create temperature control systems hitherto implemented have succeeded, in some cases, in obtaining one or more of the advantages previously mentioned, but not all of them.

The idea behind the present invention is to create a dual technology storage system using a single tank containing metal hydrides in thermal contact with a battery pack, improving both the absorption and desorption phases of hydrogen from metal hydrides, and the control battery temperature.

Metal hydrides are metal alloys capable of adsorbing hydrogen in a reversible way, and storing it at volumetric densities (g/l of H2) comparable to those of compressed hydrogen at room temperature at 1000 bar, at much lower pressures (around 5-20 bar) and temperatures close to the ambient one, with obvious advantages also in terms of passive safety of the system.

An important feature of metal hydrides is related to their thermal management: in fact, the adsorption of hydrogen is an exothermic process (which releases heat) while desorption is an endothermic process (which requires heat). The energy required for the process, both in the case of exothermic and endothermic processes, is around 30 kJ/molH2, corresponding to about 13% of the calorific value of the hydrogen itself. In other words, a tank containing metal hydrides increases its temperature when it adsorbs hydrogen, while its temperature decreases if it desorbs hydrogen.

BRIEF DESCRIPTION OF THE DRAWINGS

These and further advantages and features of the present invention will be better understood by each person skilled in the art in the light of the following description the attached drawings, given as a practical example of the invention but not to be considered in a limiting sense, in which.

In the present description, reference will be made to the use of the system of the invention (1) on a fuel cell hybrid battery plug-in vehicle driven by an electric motor (PFCEV) but the system (1) according to the invention can have a very wide field of application, for example, in any filed providing for a mixed type of power supply in which hydrogen as the main energy source and batteries as the auxiliary energy source coexists. For example, a possible application may be in the aerospace field, where solving the problems relating to thermal management of the battery pack without compromising the energetic density of the cells can be very important.

Figure 1:
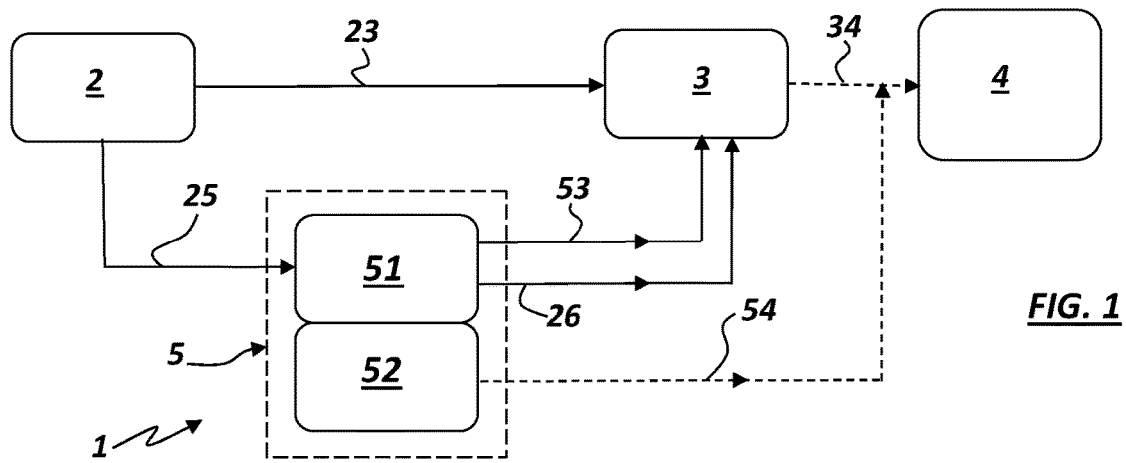
FIG. 1 is a block diagram that schematically represents a possible architecture of the hybrid storage system in an automotive application (in the example shown it is a PFCEV) highlighting the flows of hydrogen and electric energy.
Figure 2:
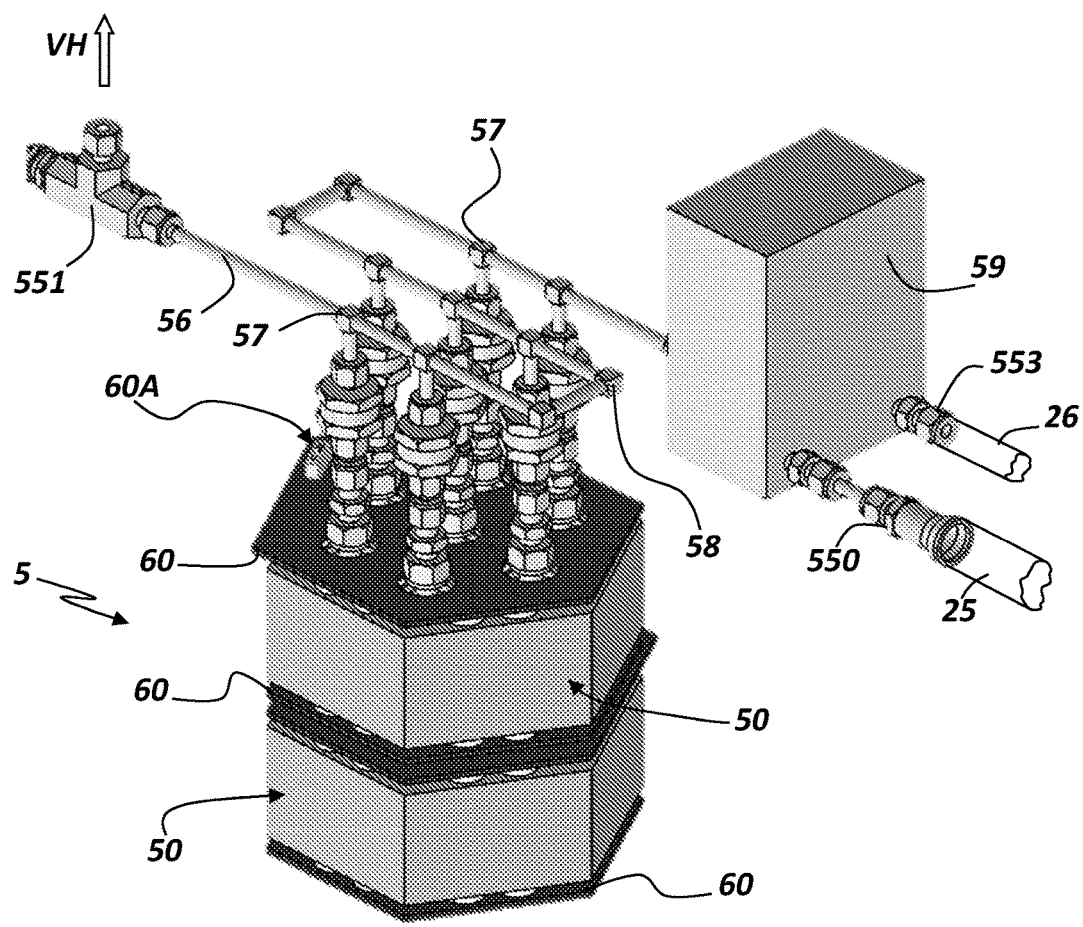
FIGS. 2, 3, 4, 5 and 6 relate to a possible embodiment of the invention which is schematically represented and is shown, respectively, in a first perspective view (FIG. 2), a second perspective view with parts removed with respect to FIG. 2 (FIG. 3), a top plan view (FIG. 4), a side view (FIG. 5) and a section view along line VI-VI of FIG. 5 (FIG. 6).

Another possible application can be implemented in hybrid energy accumulation stationary plants (i.e. with hydrogen fuel cell and electrochemical storage system) for the stabilization of the power grid, possibly in combination with renewable energy technologies. In this type of application, in case of surplus electricity in the grid, the system could store it in the form of hydrogen and/or in the batteries. Otherwise, the energy can be fed back to the power grid from the batteries and/or through a fuel cell. In this case, the advantages relate to the reduction of costs and dimensions compared to the currently available systems, and to the increase of the thermal runaway safety of the storage system. With reference to FIG. 1, the hybrid storage system of the present invention comprises a block (5), schematically delimited by a rectangle represented by a discontinuous line, which is composed of a tank containing metal hydrides (51) and a battery pack (52). The configuration of the system (1) also comprises: an auxiliary tank (2) intended to contain hydrogen in gaseous form, a fuel cell (3) and an electric energy user (4).

The auxiliary tank (2) is connected to the fuel cell (3) through a first conduit (23) and is connected to the block (5) through a second conduit (25). In other words, the hydrogen contained in the auxiliary tank can directly feed the fuel cell (3) through the conduit (23) and recharge the hydrides contained in the block (5) through the conduit (25). In turn, the hydrogen possibly desorbed by the hydrides can directly feed the fuel cell integrating or replacing the hydrogen coming from the auxiliary tank (2) through a conduit (26) that connects the tank (51) with the fuel cell (3).

The electricity produced by the fuel cell (3) is used to feed the various users, among that in FIG. 1 is indicated the main (4), namely the electric motor, which is connected to the fuel cell (3) through an electrical connection (34) represented by a discontinuous line.

The electricity produced by the fuel cell (3), as well as that produced by possible other equipment for the recovery of kinetic energy, can be used for the various on-board appliances and is usually stored in batteries for the electrochemical storage. In FIG. 1 the schematic block (52) represents the battery pack, which may include, by way of example, lithium battery cells (52A) that are housed, as further disclosed hereinafter, in a containment body (50) which also encloses the hydride tank (51) that, in turn, is composed of a plurality of cylindrical tanks or bottles (51A) suitably connected with each other. The block (5) denotes the assembly comprising the individual battery cells (52A) and the hydride tanks (51A) housed in their respective seats, marked, respectively, by references (50B) and (50A).

In the non-limiting example here disclosed, the battery pack comprises a plurality of lithium cells (52A) which can have a cylindrical or prismatic shape and are inserted in appropriate respectively cylindrical or prismatic housings (50B) provided in a containment body (50) and that can made, for example, of plastic or other electrically insulating material and are able to ensure anyway the thermal contact between the electrochemical cells (52A) and the tanks (51A).

Figure 6:
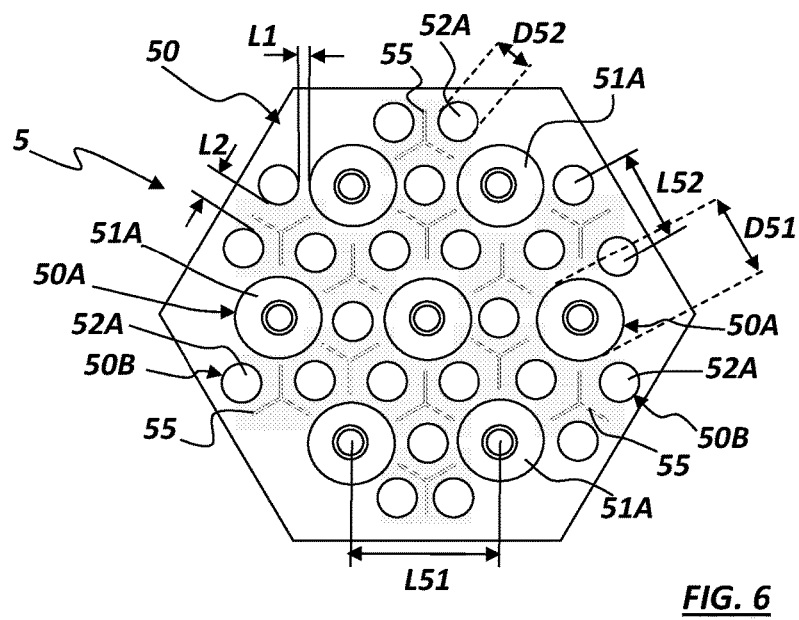

In the non-limiting example shown in FIG. 6, the containment body (50) is provided with two series of cylindrical cavities which are arranged with their respective longitudinal axes parallel with each other and vertically oriented (i.e. orthogonal to the plane of the drawing in FIG. 6). In particular, a first plurality of cylindrical cavities (50A) is intended to house the cylinders (51) which define the metal hydride tank and a second plurality of cylindrical cavities (52A) is intended to receive the electrochemical cells (52A). In FIG. 6 the circumference defined by the first cavities (50A) coincides with the external circumference of the cylinders (51A), whose diameter is indicated by (D51); similarly, the circumference defined by the second cavities (50B) coincides with the external circumference of the cells (52A), the diameter of which is indicated by (D52).

More generally, a hybrid energy storage system for mobile, propulsive and stationary applications of electric power units, used to supply energy to a user (4), in accordance with the invention comprises a battery pack (52) consisting of a plurality of batteries (52A) and a tank (51) containing metal hydrides arranged in thermal contact with the batteries (52A) that form said battery pack (52), said hydride tank (51) being formed of a plurality of tanks (51A) arranged in said battery pack (52), and comprises a containment body (50) in which several housings intended for the tanks (51A) and the batteries (52A) respectively are formed.

Obviously, in the case of batteries or tanks with a prismatic conformation, the corresponding cavities destined to receive them will consequently be prismatic. In practice, the shape and the number of additional batteries and tanks may vary according to the configuration identified by the designer according to the specific application, it being understood that for the operation of the invention a thermal contact between the additional tank/s and the battery/ies must be guaranteed.

In the drawings, the not limitative embodiment of the containment body (50) has a regular hexagonal configuration and the first cavities (50A) intended to receive the tanks (51A) are in a number which can vary; in the explanatory drawing they are, by way of example, seven in number, arranged, in particular, a first one at the centre of the hexagon and the other six, by way of example, around the first one, two by two along the three major diagonals of the hexagon (i.e. angularly equidistant). In FIG. 6 the reference "L51" denotes the interaxis between two adjacent tanks (51A) placed in the respective cavities of the body (50), while the reference "L52" denotes the interaxis between two adjacent batteries (52A) placed in the respective cavities (50B) of the same body (50).

The second cavities (50B), intended for housing the batteries (52A) are arranged around the tanks (51A) angularly equidistant from each other of a value of 60°, so as to result in a maximum number of six around to the tank (51A) located in the centre of the containment body (50). In addition, the cavities (50B) intended to receive the batteries have a diameter (D52) which is different and less than that (D51) of the cavities intended to receive the tanks (50A). In this way, the different diameter of the tanks (51A) and the batteries (52), in the arrangement illustrated by way of example provides a relatively small distance (L1) between each battery (52A) and the cylinder of the tank (51A) closest to it, so as to promote the heat exchange between these two elements (51A, 52A). At the same time, the differentiation of the diameters also determines a greater distancing (L2) between the electrochemical cells (52A). In addition, the body (50) may be provided with a plurality of cavities (55) having their axis parallel to that of said batteries (52A) and interposed between the latter to define corresponding heat isolation chambers between adjacent batteries. In practice, in the illustrated non-limiting embodiment, each cavity (55) is defined by a sort of slot formed by three wings arranged angularly equally spaced, shaped so as to separate three of said batteries (52A) further increasing the thermal insulation among them. In this way, in case of thermal runaway of a single cell, the diffusion of heat is hindered since the heat exchange between the cells is hindered.

The batteries (52A) are, by way of non-limitative example, lithium cells and are connected at their output with the motor (4) through an electrical connection (54) represented by a discontinuous line which, in the example of FIG. 1, joins the connection (34) which feeds the electric motor (4) from the fuel cell (3). In the example, electrochemical cells with lithium composite cathode have been mentioned, however the invention is effective with any other technology since temperature management is required for any electrochemical cell, i.e. for the so-called "thermal management".

The tank (51) or the bottles which define the additional tanks (51A), contain metal hydrides, preferably but not exclusively powder metal hydrides.

For example, hydrides operating at temperatures close to ambient temperatures and relatively low pressures, for example up to 20 bar, can be used. There are hundreds of alloys having these characteristics and, for example, it can be used the most commercially widespread ones, such as LaNi5 (lanthanum-nickel) and Hydralloy C alloy, produced by GfE (of the TiMnV type).

The tanks (51A) are connected with each other by a connection conduit (56). This connection conduit (56) is connected in turn to the pressure control device (59) through the connection (553). The pressure control device (59) is also provided with an upstream fitting (550) connected to the conduit (25) coming from the auxiliary tank (2). It is also possible to insert a passive safety device (551) which opens above a threshold pressure, in turn connected through the conduit (53) to the fuel cell. The arrow (VH) shows the direction of a possible hydrogen output.

Figure 3:
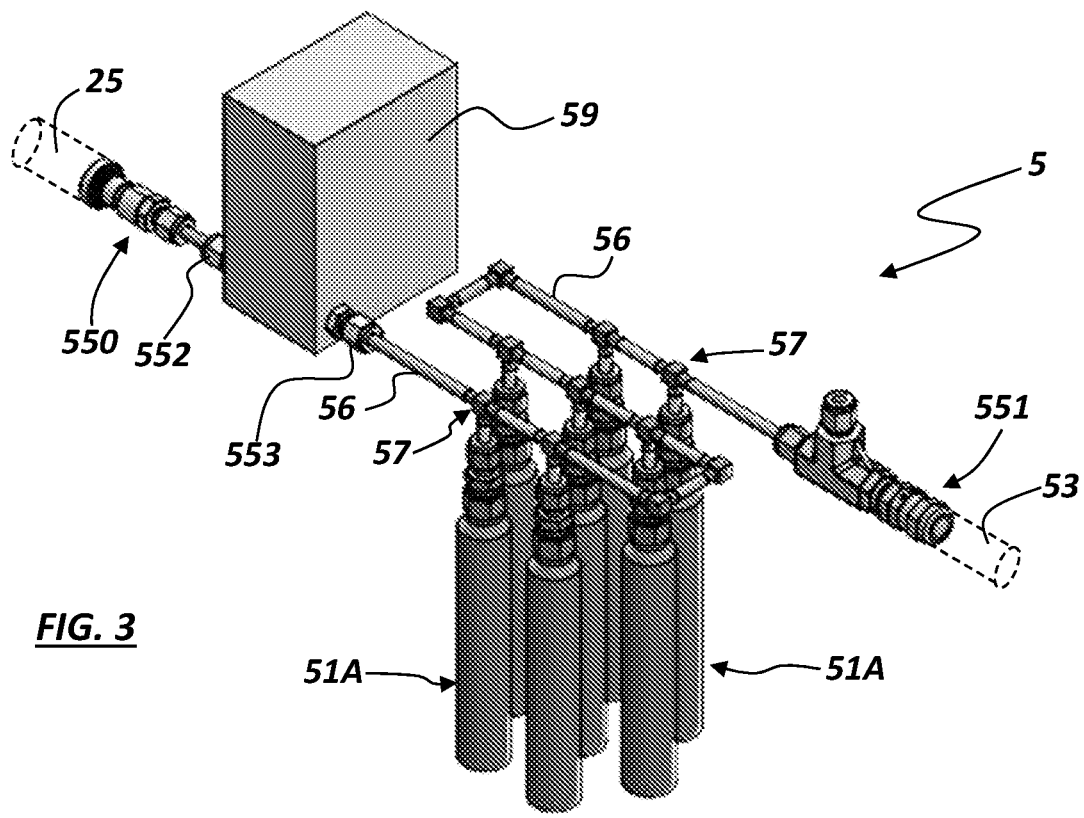
Figure 4:
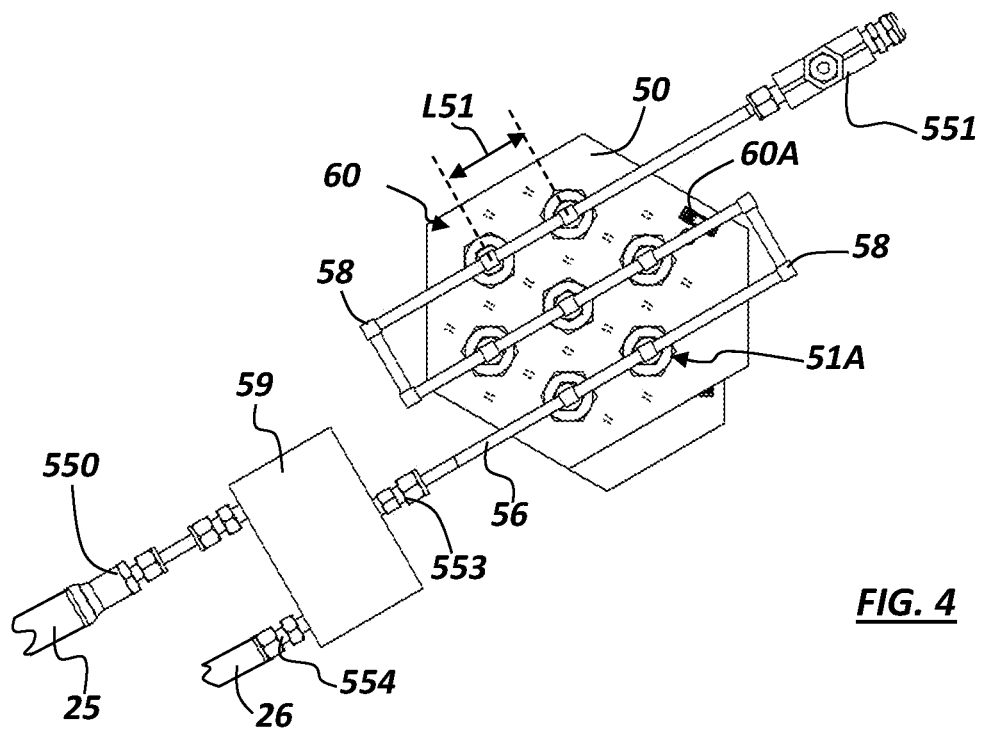
Figure 5:
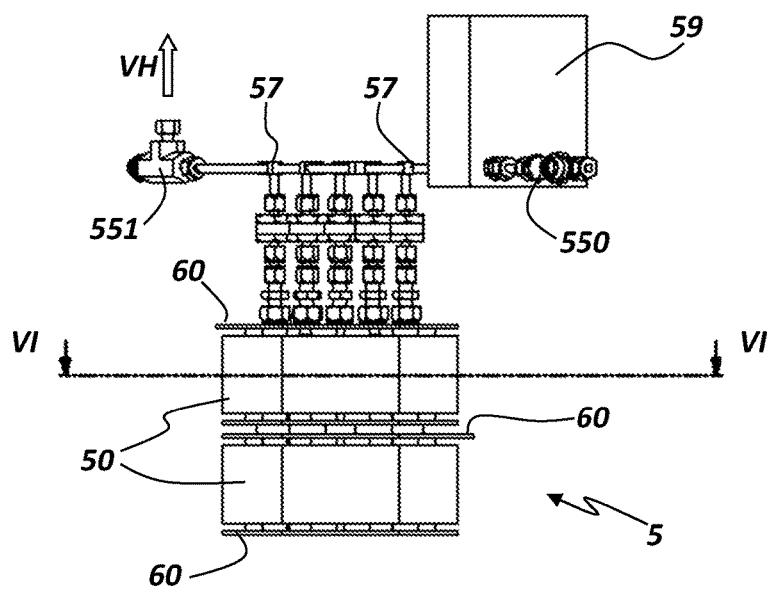

Each tank (51A) is connected to the conduit (56) by means of a joint (57) which in the example includes a "T" fitting; angular connections (58) are also provided to allow a conformation of the conduit (56) suitable for engaging all the tanks (51A). The connecting system of the cylindrical tanks (51A) represented in FIG. 3 is purely exemplificative, being advantageously realizable also according to other solutions.

The series and parallel connection of the electrochemical cells (52A) is carried out by means of respective electronic boards (60); a fuse (60A) is also provided as an additional safety device. The battery (52A) connection system shown in the drawings is provided purely by way of example, and it can be advantageously configured according to other solutions as well.

As previously said, the use of the tank (51) containing metal hydrides in thermal contact with the battery pack allows the temperature control of the same by making the metal hydrides absorb or desorb hydrogen.

For example, if there is the need to subtract excess thermal energy from the battery pack, i.e. to cool down the latter, the valve (59) is opened in order to allow the hydrogen contained in the cylinders (51A) to exit through the fitting (554) and to flow towards the fuel cell (3) through the conduit (26), causing a pressure drop in the cylinders themselves which causes the process of desorption of hydrogen from the hydrides. Since desorption is an endothermic process, this involves a lowering of the temperature of the entire system, and therefore also of the electrochemical cells (52A).

In other words, the excess heat in the batteries (52A) is used to activate the hydrogen desorption process which helps to bring the batteries (52A) back to the correct operating temperature; at the same time, the hydrogen which is desorbed by the hydrides and which has gone out through the conduit (26), is sent to the fuel cell (3) where it is oxidized producing electricity.

On the contrary, when the temperature of the batteries (52A) drops below their minimum limit value, the fitting arranged upstream (550) is opened by the valve (59) so as to permit, through the duct (25), the hydrogen contained in the main tank (2) to flow inside the tanks (51A) causing the pressure increase inside the cylinders (51A) with the consequent absorption of the hydrogen by the hydrides, with an exothermic process that determines the transmission of heat from the tanks (51A) to the battery cells (52A).

The hydrogen pressure inside the cylinders (51A) can advantageously be increased or decreased by adjusting the device (59).

The management of hydrogen absorption and desorption processes can use, by way of example only, an active control i.e. a plurality of sensors acting on the battery pack (5) capable of activating one or more opening devices acting on duct (25) and (26) to allow the flow of hydrogen corresponding to the exothermic or endothermic process to be started; this type of solution offers the advantage of being able to regulate the system in an "intelligent" way. Adding to the system an outlet valve or "relief valve" (551) it is possible to implement a passive safety system which intervenes in case of failure of the active system and avoids overpressure inside of the system. By way of example, if a thermal runaway of the battery pack takes place, with consequent attainment of a too high temperature of the batteries (52A) (and therefore too high hydrogen pressure in the cylinders 51A), the passive safety system allows automatically the hydrogen desorption by lowering the temperature of the pack.

In any case, the limit pressure starting the desorbing process must be higher (or, the same) than the fuel cell supply pressure.

Advantageously, the plastic construction of the containment body (50) such as the metal construction of the cylinders of the tanks (51A) and the cells (52A) allows effective protection of the battery pack. Furthermore, the particular configuration shown in the drawings allows an optimization of the volumes in relation to the advantages obtained.

Advantageously, the present system feeds the electric appliances (4) without the use of pumps and provides cooling/heating of the battery pack without the use of cooling/heating circuits.

In addition, the thermal management with hydrogen allows to obtain an energy density that can be doubled compared to battery packs for hybrid vehicles currently available on the market.

For example, experimental tests have shown that a battery pack made in accordance with the present invention can present energy density values even significantly higher than that of batteries available on the market, even reaching values greater than 200 Wh/kg of energy density. In other words, it is easy to understand that a system in which the thermal management is performed with a means capable in turn of accumulating energy in the form of hydrogen expands the entire pack energy density if the system is inside an appliance capable of making use and supplying the hydrogen required.

Finally, it is noted that the command and control members of the elements described above and illustrated in the attached drawings are of the type known to those skilled in the art and, therefore, have not been described in further detail for simplicity. Furthermore, the details of execution may however vary in an equivalent manner in the shape, size, number and arrangement of the elements, nature of the materials used, without however departing from the scope of the inventive concept of the invention and therefore remaining within the limits of the protection granted by this patent in accordance with the attached claims.

The invention claimed is:

1. A hybrid energy storage system with chemical/electrochemical dual technology for mobile, propulsive and stationary applications of electric power units, used to supply energy to a user, the system comprising:
a battery pack including a plurality of batteries;
a hydride tank arrangement including a plurality of hydride tanks containing metal hydrides; and
a containment body including a plurality of first housings for the plurality of batteries and a plurality of second housings for the plurality of hydride tanks;
wherein the plurality of batteries and the plurality of hydride tanks are disposed within the containment body at a reciprocal distance such that the plurality of hydride tanks are in thermal contact with the plurality of batteries inside the containment body without requiring a thermal circuit between the plurality of batteries and the plurality of hydride tanks.

2. The system according to claim 1, further comprising:
a fuel cell for generating electricity by oxidizing hydrogen; and
an outlet conduit connecting the hydride tank arrangement to the fuel cell;
wherein a heat transfer from said battery pack to said hydride tank arrangement is realized by a process of hydrogen desorption by metal hydrides contained in said hydride tank arrangement, thereby cooling the battery pack, with the desorbed hydrogen expelled from said hydride tank through the outlet conduit and converted into electric energy by the fuel cell.

3. The system according to claim 1, further comprising:
an auxiliary tank containing hydrogen at a higher pressure than that of the hydride tank arrangement; and
an inlet conduit connecting the auxiliary tank to the hydride tank arrangement;
wherein the battery pack and the plurality of batteries are heated by way of hydrogen absorption by the metal hydrides in the hydride tank arrangement.

4. The system according to claim 1, wherein:
each hydride tank of the plurality of hydride tanks is cylindrical or prismatic; and
each battery cell of the plurality of battery cells is cylindrical or prismatic.

5. The system according to claim 4, wherein:
said hydride tanks and said batteries are cylindrical;
said batteries are arranged around said tanks with their respective axes arranged parallel; and
the diameter of said plurality of tanks is greater than the diameter of said batteries, such that the distance between said batteries is greater than the distance between each battery and the hydride tank closest to said battery.

6. The system according to claim 4, the containment body is made of thermally insulating material.

7. The system according to claim 6, further comprising:
a plurality of cavities interposed between the batteries of the plurality of batteries;
wherein the axes of the cavities and the batteries are parallel; and
wherein the cavities define corresponding thermal insulation chambers between adjacent batteries.

8. The system according to claim 1, further comprising a pressure control device;
wherein the pressure inside the hydride tank arrangement is controlled using the pressure control device, so as to control the absorption and desorption processes of the hydrogen inside the tank, and therefore the consequent heating or cooling processes of the battery pack.

* * * * *